(12) United States Patent
Kim

(10) Patent No.: US 11,702,130 B2
(45) Date of Patent: Jul. 18, 2023

(54) STEERING CONTROL DEVICE AND METHOD

(71) Applicant: HL MANDO CORPORATION, Gyeonggi-do (KR)

(72) Inventor: Jung Hoo Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/586,597

(22) Filed: Jan. 27, 2022

(65) Prior Publication Data
US 2022/0242480 A1 Aug. 4, 2022

(30) Foreign Application Priority Data
Feb. 2, 2021 (KR) .......................... 10-2021-0014668

(51) Int. Cl.
*B62D 6/00* (2006.01)
*B62D 5/04* (2006.01)

(52) U.S. Cl.
CPC ............. *B62D 6/00* (2013.01); *B62D 5/0481* (2013.01)

(58) Field of Classification Search
CPC ................................ B62D 6/00; B62D 5/0481
See application file for complete search history.

*Primary Examiner* — Mathew Franklin Gordon
(74) *Attorney, Agent, or Firm* — Ladas & Parry, LLP

(57) ABSTRACT

The embodiments of the present disclosure relate to a steering control device and method. Specifically, a steering control device according to the present disclosure may include a receiver configured to receive inclination angle information, vehicle speed information of a host vehicle, steering angle information of a steering wheel, steering angular velocity information of the steering wheel, and hysteresis torque information of the host vehicle from a plurality of sensors, a determiner configured to determine whether the host vehicle is located on a flat surface based on the inclination angle information, an estimator configured to estimate a loading weight based on a hysteresis torque value compared to a steering angular velocity value if determined that the host vehicle is located on the flat surface, and a controller configured to shift an assist map based on the estimated loading weight.

18 Claims, 9 Drawing Sheets

STEERING CONTROL DEVICE AND METHOD

CROSS REFERENCE TO RELATED APPLICATION

This application claims priority from Korean Patent Application No. 10-2021-0014668, filed on Feb. 2, 2021, which is hereby incorporated by reference for all purposes as if fully set forth herein.

TECHNICAL FIELD

An embodiment of the present disclosure relates to a steering control device and method, more specifically, relates to a steering control device and method for differently outputting assist torque according to a weight of loaded cargo.

In general, a power assistance steering device is used in a vehicle as a means for reducing the steering force of a steering wheel to ensure the stability of the steering state. As such a power assistance steering device, a hydraulic power steering system (HPS) using hydraulic pressure has been widely used in the past. Recently, unlike the conventional method using hydraulic pressure, an electric power steering (EPS) system, which uses the rotational force of a motor to facilitate the driver's steering force and is environmentally friendly, is commonly used in vehicles.

Meanwhile, an electronic power steering system outputs an assist torque to assist the driver's steering according to a position of the rack. The driver's steering force may be affected by the weight of the host vehicle. Accordingly, if cargo is loaded in the host vehicle, the driver's steering force may vary according to the weight.

In particular, in the case of a large commercial vehicle, if cargo is loaded, the driver's steering force may be significantly affected since the difference in weight before and after loading is large. Accordingly, there is a demand for a method of outputting the assist torque in consideration of the weight of the vehicle.

SUMMARY

In this background, embodiments of the present disclosure provide a steering control device and method for shifting an assist map by estimating the weight of cargo loaded in a vehicle.

In an aspect of the present disclosure, there is provided a steering control device including a receiver configured to receive inclination angle information, vehicle speed information of a host vehicle, steering angle information of a steering wheel, steering angular velocity information of the steering wheel, and hysteresis torque information of the host vehicle from a plurality of sensors, a determiner configured to determine whether the host vehicle is located on a flat surface based on the inclination angle information, an estimator configured to estimate a loading weight based on a hysteresis torque value compared to a steering angular velocity value if determined that the host vehicle is located on the flat surface, and a controller configured to shift an assist map based on the estimated loading weight.

In another aspect of the present disclosure, there is provided a steering control method including receiving inclination angle information, vehicle speed information of a host vehicle, steering angle information of a steering wheel, steering angular velocity information of the steering wheel, and hysteresis torque information of the host vehicle from a plurality of sensors, determining whether the host vehicle is located on a flat surface based on the inclination angle information, estimating a loading weight based on a hysteresis torque value compared to a steering angular velocity value if determined that the host vehicle is located on the flat surface, and controlling to shift an assist map based on the estimated loading weight.

According to embodiments of the steering control device and method according to the present disclosure, it is possible to efficiently manage the steering force for the driver by estimating a weight of the cargo loaded in the host vehicle based on a hysteresis torque value compared to a steering angular velocity value of the host vehicle.

DETAILED DESCRIPTION

Figure 1:
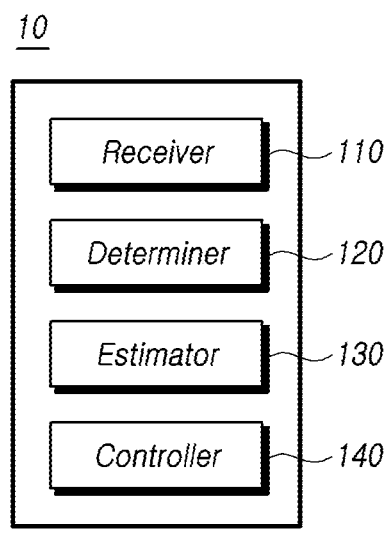
FIG. 1 schematically illustrates a steering control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a steering control device 10 according to an embodiment of the present disclosure with reference to FIG. 1.

FIG. 1 schematically illustrates a steering control device 10 according to an embodiment of the present disclosure.

Referring to FIG. 1, a steering control device 10 according to an embodiment of the present disclosure may include a receiver 110, a determiner 120, an estimator 130, a controller 140, or the like.

The steering control device 10 may receive detection information from a plurality of sensors to estimate the weight of the cargo loaded in the host vehicle, and may shift an assist map based on the estimated loading weight.

The receiver 110 may receive detection information from a plurality of sensors mounted on the host vehicle. Specifically, the receiver 110 may receive, from a plurality of sensors, inclination angle information on the inclination angle of a surface or a ground on which the host vehicle is traveling, vehicle speed information of the host vehicle, steering angle information of the steering wheel, steering angular velocity information of the steering wheel, and hysteresis torque information. To this end, an inclination angle sensor, a vehicle speed sensor, a steering angle sensor, a steering angular velocity sensor, and a torque sensor may be mounted on the host vehicle. In addition, each of the information may be calculated in the form of a numerical value such as a number. For example, the hysteresis torque information may be calculated as a hysteresis torque value to be applied to an assist map.

The determiner 120 may determine whether the host vehicle is located on a flat surface or a flat ground based on the inclination angle information. Specifically, the determiner 120 may determine an inclination angle with respect to the location of the host vehicle by using the inclination angle information received from the receiver 110, and may determine whether the host vehicle is located on a flat surface or a flat ground based on the determination result.

The determiner 120 may determine whether the host vehicle is stopped based on vehicle speed information of the host vehicle. Specifically, the determiner 120 may determine the current vehicle speed of the host vehicle by using the vehicle speed information of the host vehicle received from the receiver 110, and may determine whether the host vehicle is stopped based thereon.

If it is determined that the host vehicle is located on a flat ground, the estimator 130 may estimate a loading weight based on the hysteresis torque value compared to the steering angular velocity value. Specifically, the estimator 130 may set a specific criterion by measuring a hysteresis torque value compared to a steering angular velocity value in the case that there is no cargo, and a hysteresis torque value compared to a steering angular velocity value in the case that a specific cargo is loaded by a loading weight, and may estimate the loading weight of the currently loaded cargo according to the set criteria.

The estimator 130 may estimate the loading weight of the cargo based on a hysteresis torque value compared to a steering angular velocity value in the case that the host vehicle is located on a flat ground and the host vehicle is stopped. Specifically, in order to estimate the correct loading weight, the determiner 120 may further determine whether the host vehicle is stationary or stopped based on vehicle speed information in addition to determining the inclination angle, and the estimator 130 may estimate the loading weight of the cargo loaded in the host vehicle by measuring a hysteresis torque value compared to a steering speed in the cased of steering the vehicle in a stopped state.

As described above, the steering control device 10 may increase the accuracy of estimating the loading weight by estimating the weight of the cargo loaded in the host vehicle in the case that the host vehicle is located on a flat surface and is stopped.

The estimator 130 may compares a first weight estimation result value estimated based on the hysteresis torque value compared to the steering angular velocity value with a second weight estimation result value estimated based on the pressure information, and, if a difference between the first weight estimation result value and the second weight estimation result value is less than or equal to a threshold value, may estimate the loading weight of the cargo loaded in the host vehicle based on the comparison result.

Specifically, in order to more accurately estimate the loading weight, the receiver 110 may further receive pressure information on the tire of the host vehicle, and the estimator 130 may compare the first weight estimation result value previously estimated based on the hysteresis torque value compared to steering angular velocity value and the second weight estimation result value estimated based on the pressure information received from the receiver 110. Here, the tire pressure varies greatly depending on the outside temperature, and since the tire pressure is not always constantly maintained, it is necessary to maintain the pressure of the tire through inflation. Therefore, in order to estimate the loading weight using the tire pressure, there may be set a reference of a tire pressure change amount for the loading weight of the cargo at a specific tire pressure. In addition, there may estimate the loading weight of the host vehicle by detecting the tire pressure change amount according to the set reference. In addition, the loading weight of the host vehicle may be estimated by comparing the tire pressure value immediately before the cargo is loaded with the tire pressure value after the cargo is loaded. Furthermore, if the difference between the above-described first weight estimation result value and the second weight estimation result value is equal to or less than a threshold value, the estimator 130 may estimate the first weight estimation result value as the loading weight.

The estimator 130 may compare the above-described first weight estimation result value with a third weight estimation result value estimated based on a steering angle value of the steering wheel and the hysteresis torque value, and, if a difference between the first weight estimation result value and the third weight estimation result value is less than or equal to a threshold value, the estimator 130 may estimate the first weight estimation result value as the loading weight.

Here, since the third weight estimation result value is a value estimated based on the hysteresis torque value according to the steering angle position of the steering wheel, the heavier the cargo loaded in the host vehicle, the greater the hysteresis torque value according to the steering angle position of the steering wheel. Accordingly, the hysteresis torque value according to the steering angle position of the steering wheel at a specific loading weight may be set as a reference, and, if the hysteresis torque value is received at the steering angle of the same steering wheel, the loading weight of the host vehicle may be estimated.

The estimator 130 may estimate the loading weight only with the second weight estimation result value, and may estimate the loading weight only with the third weight estimation result, and may transmit the estimated loading weight to the controller 140.

Meanwhile, the threshold value for the comparison between the above-described first weight estimation result value and the second weight estimation result value and the threshold value for the comparison between the first weight estimation result value and the third weight estimation result value may be the same.

As described above, the steering control device 10 may more accurately estimate the loading weight by comparing the first to third weight estimation result values estimated by different methods with each other.

The controller 140 may shift an assist map based on the estimated loading weight. Here, the shifting may be a change in the slope of the assist curve by increasing or decreasing the assist torque value corresponding to the hysteresis torque value of the assist map, which will be described later.

Figure 2:
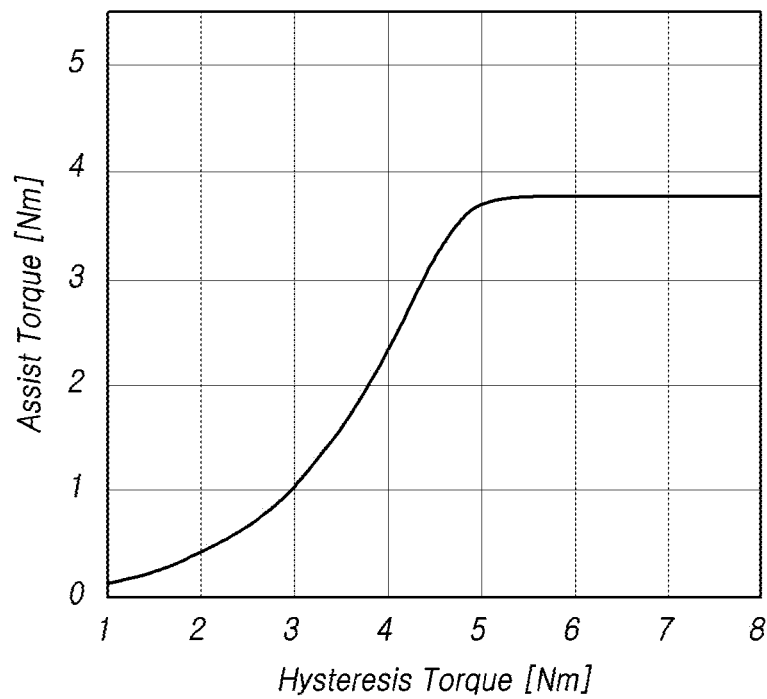
FIGS. 2 and 3 are diagrams for explaining an assist map according to an embodiment.
Figure 3:
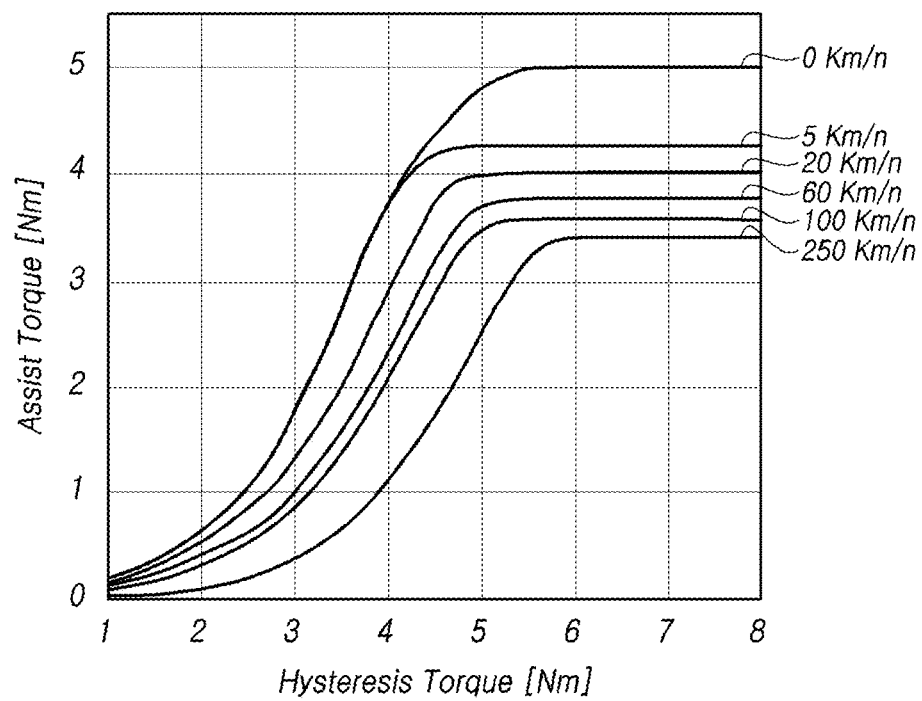

FIGS. 2 and 3 are diagrams for explaining an assist map according to an embodiment.

Referring to FIG. 2, the assist map may be configured by setting an assist torque value corresponding to a hysteresis torque value according to a predetermined criterion. Here, the assist map may be created based on an assist curve. Specifically, the assist torque is generated by being changed according to the hysteresis torque (or input torque) generated by the driver, and a curve representing the value of the assist torque according to the input torque may be defined as the assist curve. Here, the hysteresis torque may mean a force applied to the torsion bar. In addition, since the hysteresis torque value increases toward the end of the rack, the hysteresis torque may mean a torque value according to a position. Therefore, as the loading weight increases, the slope of the assist curve may increase toward the end of the rack.

In summary, a hysteresis torque is generated by the driver steering the steering wheel, and an assist torque corresponding to the hysteresis torque is generated according to the assist map.

Referring to FIG. 3, there may be created the assist map capable of calculating an assist torque value according to the steering torque value and the speed of the vehicle by summing a plurality of assist curves generated for each vehicle speed based on the assist torque value according to the hysteresis torque value.

The assist map may be applied by receiving data in which values are stored in the steering control device 10 according to a predetermined criterion in advance. Alternatively, the assist map may be created by setting and storing a hysteresis torque value and an assist torque value corresponding thereto according to a predetermined criterion in the steering control device 10.

Figure 4:
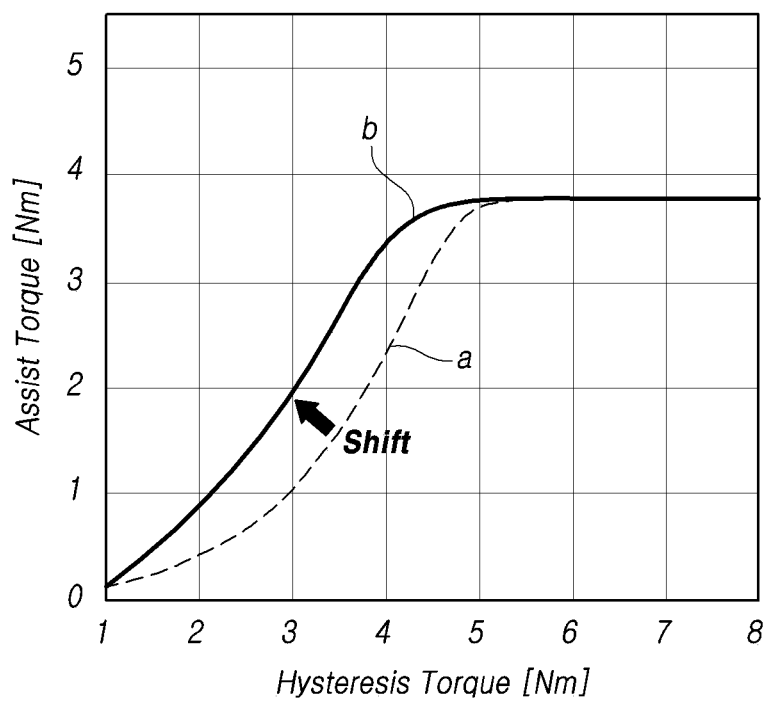
FIGS. 4 and 5 are diagrams for explaining that the assist map is shifted by the estimated weight according to an embodiment.
Figure 5:
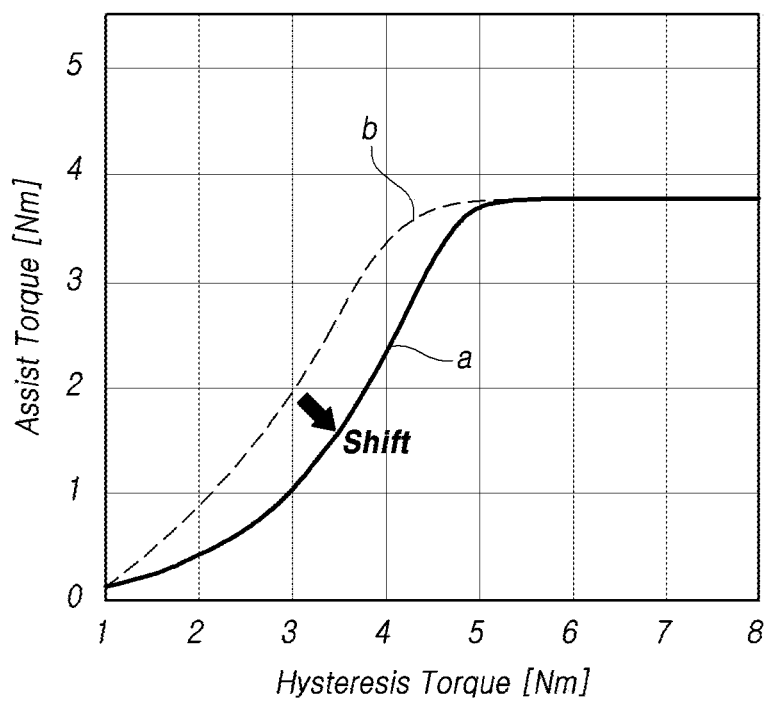

FIGS. 4 and 5 are diagrams for explaining that the assist map is shifted by the estimated weight according to an embodiment.

Referring to FIG. 4, if the estimated loading weight exceeds a predetermined reference weight, the controller 140 may shift the assist map so that an assist torque value corresponding to the hysteresis torque value increases. Specifically, if the loading weight estimated by the estimator 130 exceeds the predetermined reference weight, the controller 140 may shift an assist curve 'a' of FIG. 4 to an assist curve 'b' of FIG. 4 so that the assist torque value corresponding to each hysteresis torque increases.

Referring to FIG. 5, if the estimated loading weight is less than or equal to a predetermined reference weight, the controller 140 may shift the assist map so that an assist torque value corresponding to the hysteresis torque value decreases. Specifically, if the loading weight estimated by the estimator 130 is less than or equal to the predetermined reference weight, the controller 140 may shift an assist curve 'b' of FIG. 5 to an assist curve 'a' of FIG. so that the assist torque value corresponding to each hysteresis torque decreases.

As described above, the steering control device 10 may shift the assist map according to the reference weight. In particular, the steering control device according to the present embodiment may be used to add a shift element according to the vehicle weight to the basic assist function of an electronic recirculating ball-nut (eRCB) steering system. The eRCB steering system is a steering device that electrifies a ball-nut mechanism as a steering mechanism for a large vehicle such as a commercial vehicle. Since the steering control device according to the present disclosure is applied to the eRCB steering device, it is possible to optimally improve the steering performance of the steering device for a commercial vehicle having a large loading weight.

Figure 6:
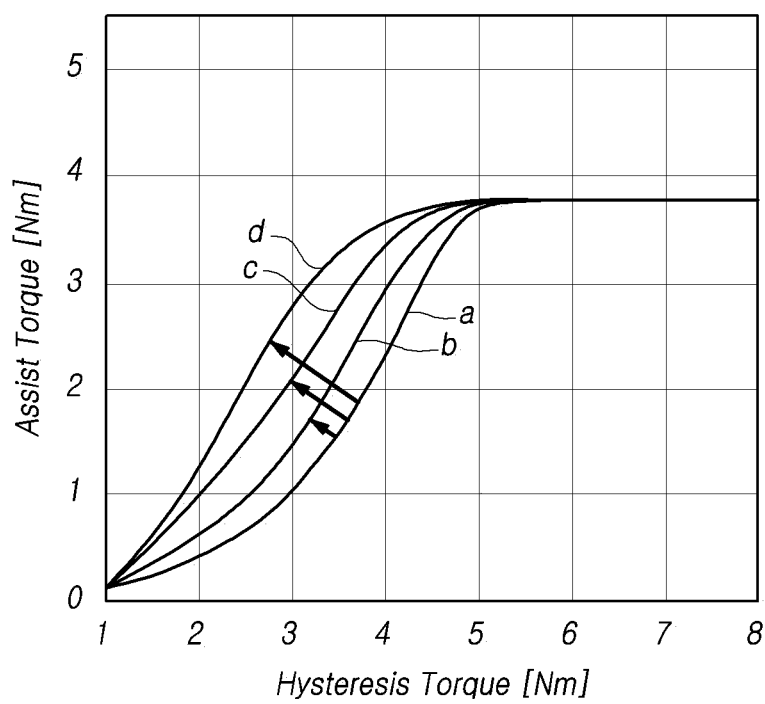
FIG. 6 is a diagram for explaining shifting of an assist map for each estimated weight, according to an embodiment.

FIG. 6 is a diagram for explaining shifting of an assist map for each estimated weight, according to an embodiment.

Referring to FIG. 6, the controller 140 may classify the estimated loading weight into one of a plurality of weight sections, and set an assist torque value corresponding to the hysteresis torque value for each classified weight section. In particular, in order to differently apply the assist torque value corresponding to the hysteresis torque value for each weight, the controller 140 may classify the estimated loading weight into a plurality of weight sections. In the plurality of weight sections, an assist torque value corresponding to the same hysteresis torque value may be different for each section. Accordingly, if the loading weight estimated by the estimator 130 is included in any one of a plurality of classified weight sections, the controller 140 may set the assist torque value applied in the corresponding weight section to correspond to the hysteresis torque value. That is, the slope of the assist curve in the assist map may be changed according to the estimated loading weight. For example, if the plurality of weight sections is classified into three, the controller 140 may shift the assist curve 'a' of FIG. 6 to any one of assist curves 'b', 'c', 'd' of FIG. 6 according to which section the estimated loading weight is included.

The steering control device 10 of the present disclosure may be implemented as an electronic control unit (ECU). The electronic control unit may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the steering control device 10 according to the present embodiment and the receiver 110, the determiner 120, the estimator 130, and the controller 140 included therein may be implemented as a control device of a steering system of a vehicle or as a module of an ECU.

The control device or ECU of such a steering system may include a processor, a storage device such as a memory, and a computer program capable of performing a specific function. In addition, the above-described receiver 110, the determiner 120, the estimator 130 and the controller 140 may be implemented as software modules capable of performing respective corresponding functions.

That is, the receiver 110, the determiner 120, the estimator 130, and the controller 140 according to the present embodiment may be implemented as respective software modules and stored in a memory, and each software module may be executed at a specific time point in an arithmetic processing unit such as an ECU included in the steering system.

Hereinafter, it will be described a steering control method using the steering control device 10 performing all of the above-described present disclosure.

Figure 7:
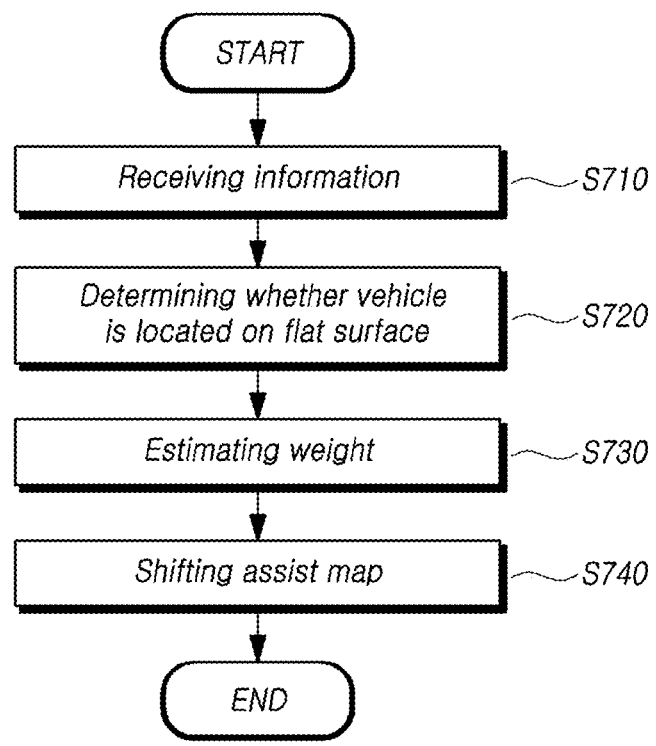
FIG. 7 is a flowchart illustrating a steering control method according to an embodiment of the present disclosure.

FIG. 7 is a flowchart illustrating a steering control method according to an embodiment of the present disclosure.

Referring to FIG. 7, a steering control method according to the present disclosure may include receiving inclination angle information, vehicle speed information of a host vehicle, steering angle information of a steering wheel, steering angular velocity information of the steering wheel, and hysteresis torque information of the host vehicle from a plurality of sensors (S710), determining whether the host vehicle is located on a flat surface based on the inclination angle information (S720), estimating a loading weight based on a hysteresis torque value compared to a steering angular velocity value if determined that the host vehicle is located on the flat surface (S730), and controlling to shift an assist map based on the estimated loading weight (S740).

In step S740 of shifting the assist map, if the estimated loading weight exceeds a predetermined reference weight, the assist map may be set so as to increase the assist torque value corresponding to the hysteresis torque value.

In addition, in step S740 of shifting the assist map, if the estimated loading weight is less than or equal to a predetermined reference weight, the assist map may be set so as to decrease the assist torque value corresponding to the hysteresis torque value.

Figure 8:
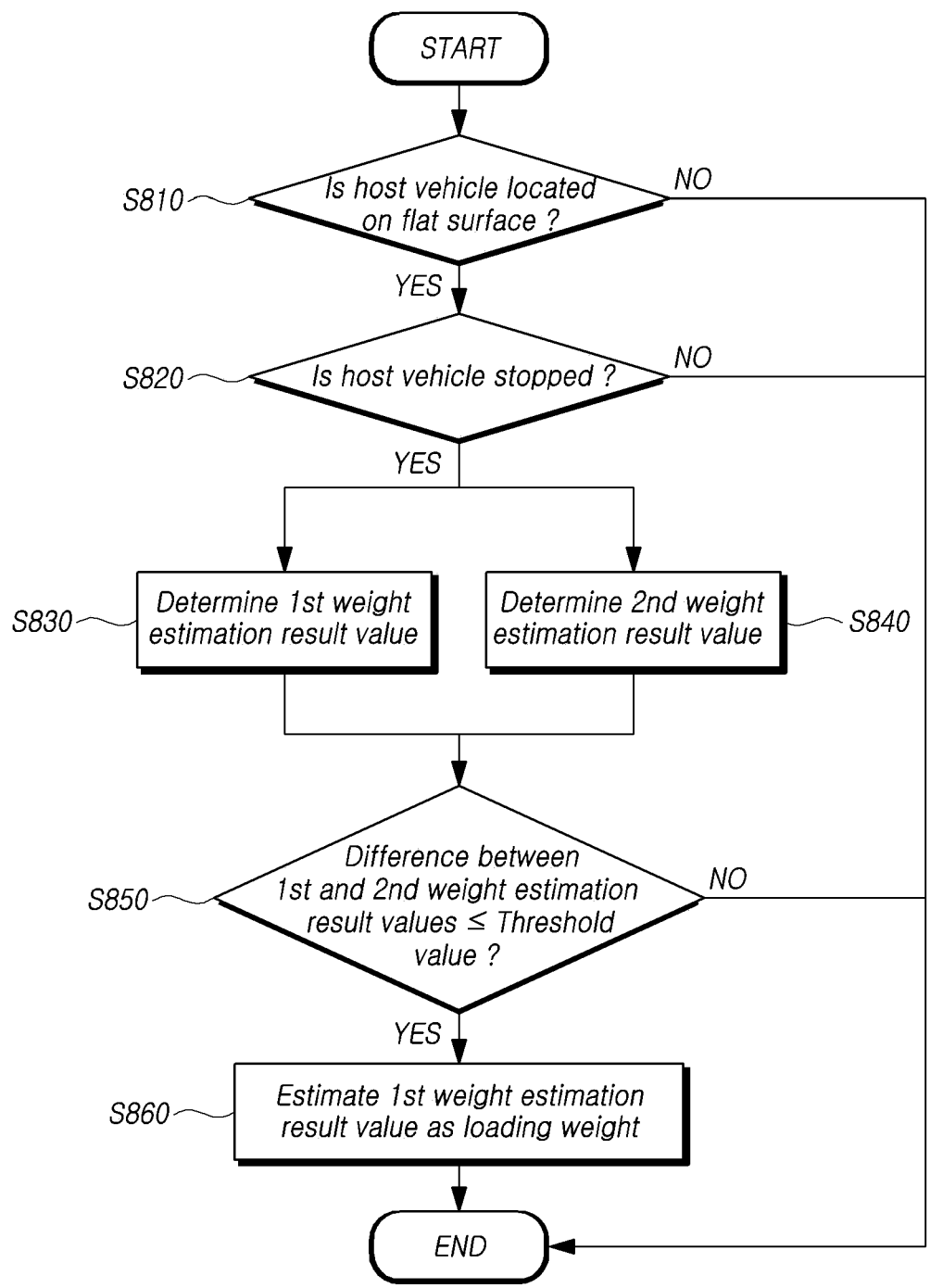
FIG. 8 is a diagram for describing step S730 of FIG. 7 in detail.

FIG. 8 is a diagram for describing step S730 of FIG. 7 in detail.

The steering control device 10 may determine whether the host vehicle is located on a flat surface (S810). The steering control device 10 may receive detection information from a plurality of sensors, and may receive inclination angle information about the inclination angle of a surface or a ground on which the host vehicle is traveling to determine whether the host vehicle is located is a flat surface.

If the host vehicle is located on a flat surface (S810—Y), the steering control device 10 may determine whether the host vehicle is stopped (S820). The steering control device 10 may receive vehicle speed information on the traveling speed of the host vehicle from the vehicle speed sensor and determine whether the host vehicle is stopped.

If the host vehicle is stopped (S820—Y), the steering control device 10 may determine a first weight estimation result based on the hysteresis torque value compared to the steering angular velocity value (S830).

In addition, the steering control device 10 may determine an estimated second weight estimation result value based on the pressure information of the tire (S840).

The steering control device 10 may compare the above-described first weight estimation result value with the second weight estimation result value, and determine whether the difference is equal to or less than a threshold value (S850).

If the difference between the first weight estimation result value and the second weight estimation result value is less than or equal to a threshold value (S850—Y), the steering control device 10 may estimate the first weight estimation result value as the loading weight. The steering control device 10 may determine a third weight estimation result value based on the steering angle value of the steering wheel and the hysteresis torque value, may compare the third weight estimation result value with the first weight estimation result value or the second weight estimation result. As the comparison result, if the difference between values is equal to or less than the threshold value, the steering control device 10 may estimate the first weight estimation result value or the second weight estimation result value as the loading weight.

Figure 9:
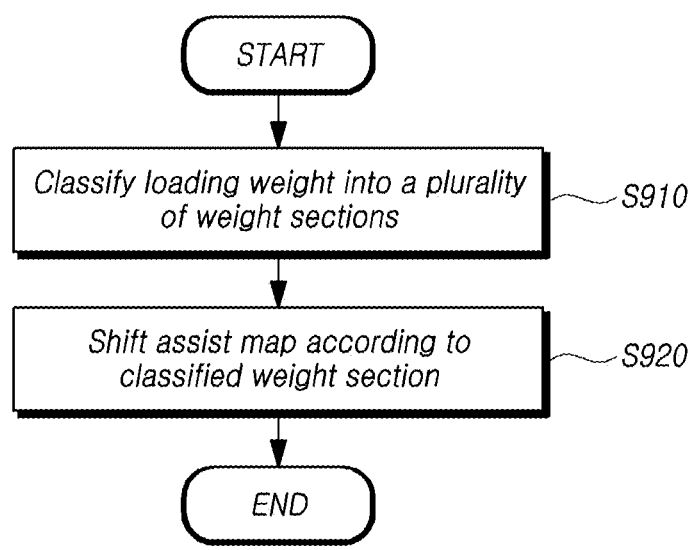
FIG. 9 is a diagram for describing step S740 of FIG. 7 in detail.

FIG. 9 is a diagram for describing step S740 of FIG. 7 in detail.

Referring to FIG. 9, after the loading weight is estimated, the steering control device 10 may classify the estimated loading weight into any one of a plurality of weight sections (S910). The steering control device 10 may set an assist torque value corresponding to a hysteresis torque value for each classified weight section (S920). In order to set the assist torque value corresponding to the hysteresis torque value differently according to the estimated loading weight, the steering control device 10 may divide a plurality of weight sections and set an assist torque value corresponding to the classified weight sections.

As described above, according to the present disclosure, it is possible to allow the driver to efficiently manage the force required to steer by estimating the weight of the cargo loaded in the host vehicle by the steering control device and method.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device comprising:
a receiver configured to receive inclination angle information, vehicle speed information of a host vehicle, steering angle information of a steering wheel, steering angular velocity information of the steering wheel, and hysteresis torque information of the host vehicle from a plurality of sensors;
a determiner configured to determine whether the host vehicle is located on a flat surface based on the inclination angle information;
an estimator configured to estimate a loading weight based on a hysteresis torque value compared to a steering angular velocity value if determined that the host vehicle is located on the flat surface; and
a controller configured to shift an assist map based on the estimated loading weight.

2. The steering control device of claim 1, wherein, in the assist map, an assist torque value corresponding to the hysteresis torque value is set according to a predetermined criterion.

3. The steering control device of claim 2, wherein, in the assist map, the assist torque value corresponding to the hysteresis torque value is set according to a speed of the host vehicle.

4. The steering control device of claim 1, wherein, if the estimated loading weight exceeds a predetermined reference weight, the controller shifts the assist map so that an assist torque value corresponding to the hysteresis torque value increases.

5. The steering control device of claim 1, wherein, if the estimated loading weight is less than or equal to a predetermined reference weight, the controller shifts the assist map so that an assist torque value corresponding to the hysteresis torque value decreases.

6. The steering control device of claim 1, wherein the determiner further determines whether the host vehicle is stopped, and the estimator estimates the loading weight if the host vehicle is located on a flat surface and stopped.

7. The steering control device of claim 1, wherein the controller classifies the estimated loading weight into one of a plurality of weight sections, and sets an assist torque value corresponding to the hysteresis torque value for each classified weight section.

8. The steering control device of claim 1, wherein the receiver further receives pressure information on a tire of the host vehicle,
wherein the estimator compares a first weight estimation result value estimated based on the hysteresis torque value compared to the steering angular velocity value with a second weight estimation result value estimated based on the pressure information, and, if a difference between the first weight estimation result value and the second weight estimation result value is less than or equal to a threshold value, the estimator estimates the first weight estimation result value as the loading weight.

9. The steering control device of claim 1, wherein the estimator compares a first weight estimation result value estimated based on the hysteresis torque value compared to the steering angular velocity value with a third weight estimation result value estimated based on a steering angle value of the steering wheel and the hysteresis torque value, and, if a difference between the first weight estimation result value and the third weight estimation result value is less than or equal to a threshold value, the estimator estimates the first weight estimation result value as the loading weight.

10. A steering control method comprising:
receiving inclination angle information, vehicle speed information of a host vehicle, steering angle information of a steering wheel, steering angular velocity information of the steering wheel, and hysteresis torque information of the host vehicle from a plurality of sensors;
determining whether the host vehicle is located on a flat surface based on the inclination angle information;
estimating a loading weight based on a hysteresis torque value compared to a steering angular velocity value if determined that the host vehicle is located on the flat surface; and
controlling to shift an assist map based on the estimated loading weight.

11. The steering control method of claim 10, wherein in the assist map, an assist torque value corresponding to the hysteresis torque value is set according to a predetermined criterion.

12. The steering control method of claim 11, wherein, in the assist map, the assist torque value corresponding to the hysteresis torque value is set according to a speed of the host vehicle.

13. The steering control method of claim 10, wherein controlling to shift an assist map comprises, if the estimated loading weight exceeds a predetermined reference weight, shifting the assist map so that an assist torque value corresponding to the hysteresis torque value increases.

14. The steering control method of claim 10, wherein controlling to shift an assist map comprises, if the estimated loading weight is less than or equal to a predetermined reference weight, shifting the assist map so that an assist torque value corresponding to the hysteresis torque value decreases.

15. The steering control method of claim 10, wherein the determining comprises further determining whether the host vehicle is stopped, and estimating a loading weight comprises estimating the loading weight if the host vehicle is located on a flat surface and stopped.

16. The steering control method of claim 10, wherein controlling to shift an assist map comprises classifying the estimated loading weight into one of a plurality of weight sections, and setting an assist torque value corresponding to the hysteresis torque value for each classified weight section.

17. The steering control method of claim 10, wherein the receiving comprises further receiving pressure information on a tire of the host vehicle,
wherein estimating a loading weight comprises comparing a first weight estimation result value estimated based on the hysteresis torque value compared to the steering angular velocity value with a second weight estimation result value estimated based on the pressure information, and, if a difference between the first weight estimation result value and the second weight estimation result value is less than or equal to a threshold value, estimating the first weight estimation result value as the loading weight.

18. The steering control method of claim 10, wherein estimating a loading weight comprises comparing a first weight estimation result value estimated based on the hysteresis torque value compared to the steering angular velocity value with a third weight estimation result value estimated based on a steering angle value of the steering wheel and the hysteresis torque value, and, if a difference between the first weight estimation result value and the third weight estimation result value is less than or equal to a threshold value, estimating the first weight estimation result value as the loading weight.

\* \* \* \* \*